(No Model.)
A. PEEL.
HUB.
No. 501,158. Patented July 11, 1893.
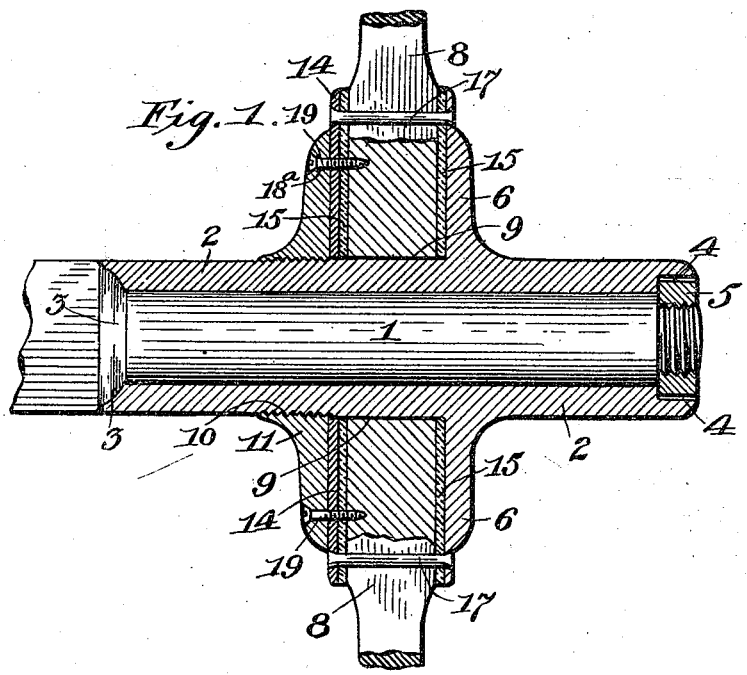
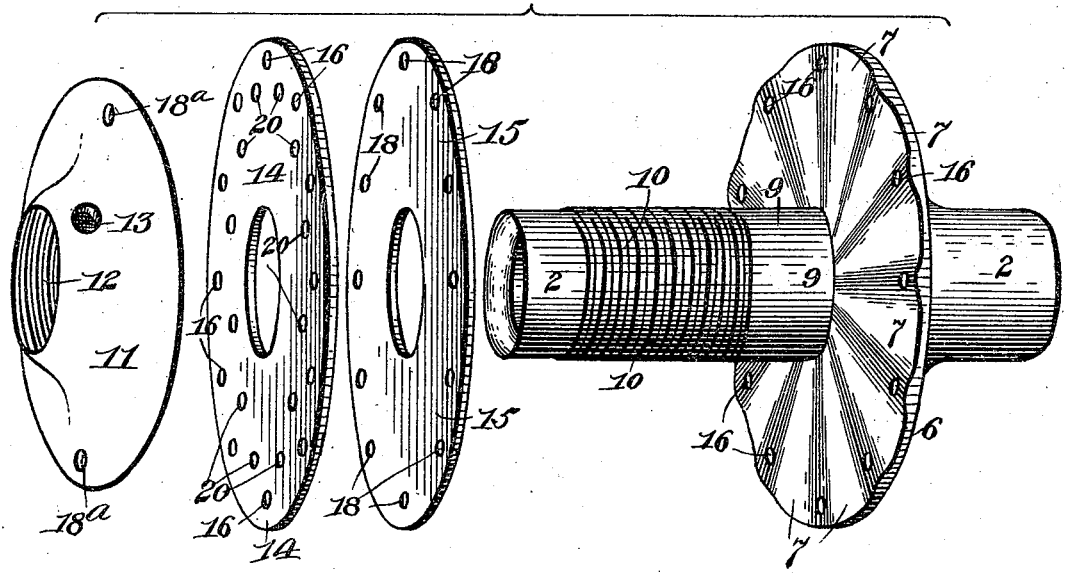
Witnesses:
Severance
C. C. Hires
Inventor:
Albert Peel,
By J. B. Lawyer,
Atty.

UNITED STATES PATENT OFFICE.

ALBERT PEEL, OF AVOCA, ARKANSAS.

HUB.

SPECIFICATION forming part of Letters Patent No. 501,158, dated July 11, 1893.

Application filed January 17, 1893. Serial No. 458,700. (No model.)

*To all whom it may concern:*

Be it known that I, ALBERT PEEL, a citizen of the United States, residing at Avoca, in the county of Benton and State of Arkansas, have invented certain new and useful Improvements in Hubs; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has for its object to provide certain new and useful improvements in the construction of hubs for vehicles, it relating more especially to the construction of a hub whereby a spoke or spokes may be inserted or removed without removing the felly or tire of the wheel, whereby the spokes will be securely held in position and whereby a hub will be formed that will be cheap, simple and durable, and for these purposes it consists in the construction, arrangement and combination of the several parts of which it is composed as will be hereinafter more fully described and claimed.

Referring to the accompanying drawings in which corresponding parts are designated by similar marks of reference: Figure 1 is a section through a hub. Fig. 2 is a perspective view thereof, the several parts thereof being separated for purposes of illustration.

In the drawings I have shown my improved hub as applied to the axle of the vehicle, the box 2 of the hub fitting over the said axle and having its inner end provided with bearing faces 2ª which are received by the shoulders 3 of the axle 1, while the outer end of the said box is stepped as at 4 to receive the nut 5 screwed upon the outer end of the axle, which thus holds the box in place. An annular flange 6 is formed upon the outside of the box at a proper point thereon, the said flange 6 having grooves or depressions 7 in its inner face, the said grooves being radial from the box and being adapted to receive the ends of the spokes 8, which are wedged shaped, the smaller ends thereof abutting against the seat 9 on the outside of the box. Screw threads 10 are formed on the outside of the box adjoining the seat 9 thereon, upon which threads a nut 11, having a central threaded aperture 12 is adapted to the screw, the said nut 11 having an aperture 13 therein, into which a lever may be inserted to turn it. A washer 14 is mounted on the box, the outer face thereof resting against the nut 11, the spokes being contained between the flange 6 and the washer 14, while elastic disks 15 encircle the box on each side of the spokes and between them and the flange and the washer 14, the function of these disks being to afford an elastic cushion for the spokes, whereby the liability to bruising their ends is obviated, and any slack that may exist is taken out. The washer 14 and the flange 6 are perforated at 16, to permit the insertion of bolts or rivets 17, which pass between the said spokes 8, and through the perforations 16 in the washer and flange and the perforations 18 in the elastic disks 13 thus permitting the washer to be drawn directly toward the flange, tightening it upon the spokes. The nut 11 has two perforations 18ª therein into which two screws 19 are adapted to be inserted, the said perforations 18 being adapted, when the nut is screwed upon the box, to register with two of the series of perforations 20 in the washer, through which two perforations 20 the screws 19 are adapted to pass, the ends of the said screws taking into the spokes, thus locking the nut against rotation. It will be seen that the nut by bearing on the washer 14, firmly presses the latter against the spokes and compresses the disks 15, and that by removing the nut 10, washer 14 and the disks 15, adjacent thereto, any one or more of the spokes may be taken out and the others substituted therefor, without disturbing the felly of the tire, while the manner of assembling the parts is obvious from the foregoing description. It will also be seen that if the spoke should shrink and become loosened they can be tightened by the nut 11 and bolt 17, and by inserted wedges between them; and that if they become too short they can be lengthened by inserting a wedge or other suitable thickness of material between their inner ends and the seat 9 on the box, while the elastic washer will prevent the bruising of the spoke and their becoming smooth, whereby they would be caused to slip.

Having thus described my invention, what I claim, and desire to secure by Letters Patent, is—

In a hub, the combination with a box having an annular perforated flange upon the periphphery thereof, the said flange having a grooved inner face; a perforated washer mounted on the said box, perforated elastic disks mounted on the said box between the said flange and washer; bolts passing through the said flanged disks and washer, and drawing them together, a perforated nut screwed upon the said box and having an aperture to receive a lever, and screws passing through the perforations in the said nut and into the said washer, substantially as described.

In testimony whereof I affix my signature in presence of two witnesses.

ALBERT PEEL.

Witnesses:
J. W. DUCKWORTH,
E. R. MORGAN.